United States Patent
Mahadevan et al.

(10) Patent No.: US 12,476,901 B2
(45) Date of Patent: Nov. 18, 2025

(54) INTELLIGENT ROUTE SELECTION AND DISTRIBUTION IN SD-WAN ROUTING CONTROLLERS BASED ON PEER'S TRANSPORT CHARACTERISTICS

(71) Applicant: Cisco Technology, Inc., San Jose, CA (US)

(72) Inventors: Satish Kumar Mahadevan, San Ramon, CA (US); Sourav Sen, San Jose, CA (US); Hamzah Shuaib Kardame, San Jose, CA (US); Jean-Marc Barozet, Le Perreux sur Marne (FR); Basavaraju Halappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/349,752

(22) Filed: Jul. 10, 2023

(65) Prior Publication Data
US 2024/0348530 A1 Oct. 17, 2024

Related U.S. Application Data

(60) Provisional application No. 63/495,931, filed on Apr. 13, 2023.

(51) Int. Cl.
*H04L 45/00* (2022.01)
*H04L 45/76* (2022.01)
*H04W 40/02* (2009.01)

(52) U.S. Cl.
CPC .............. *H04L 45/22* (2013.01); *H04L 45/76* (2022.05); *H04W 40/02* (2013.01)

(58) Field of Classification Search
CPC ..... H04L 45/22; H04L 45/76; H04L 12/4633; H04W 40/02
See application file for complete search history.

(56) References Cited

U.S. PATENT DOCUMENTS

| | | | |
|---|---|---|---|
| 10,523,560 B2 * | 12/2019 | Shenoy | H04L 12/4641 |
| 2020/0177550 A1 * | 6/2020 | Valluri | H04L 63/0272 |
| 2020/0358693 A1 * | 11/2020 | Rawlins | H04L 45/44 |
| 2021/0036987 A1 * | 2/2021 | Mishra | H04L 12/4641 |
| 2021/0058284 A1 | 2/2021 | Chandramohan et al. | |
| 2021/0306261 A1 * | 9/2021 | Duan | H04L 43/10 |
| 2021/0367883 A1 * | 11/2021 | Zhang | H04L 45/64 |
| 2021/0392070 A1 * | 12/2021 | Zad Tootaghaj | H04L 43/14 |
| 2022/0045933 A1 | 2/2022 | Shen et al. | |
| 2023/0052974 A1 * | 2/2023 | Thoria | H04L 63/029 |
| 2024/0056359 A1 * | 2/2024 | Ramanathan | H04L 41/0886 |

FOREIGN PATENT DOCUMENTS

CN 115941580 A * 4/2023 ......... H04L 12/4633

OTHER PUBLICATIONS

Cisco: "Cisco SD-WAN Routing Configuration Guide, Cisco IOS XE Release 17.x", Apr. 30, 2020, 180 Pages.

* cited by examiner

*Primary Examiner* — Habte Mered
(74) *Attorney, Agent, or Firm* — Polsinelli P.C.

(57) ABSTRACT

The present technology intelligently selects routes to be distributed to edge network device from SD-WAN controllers. Rather than indiscriminately distributing routes, the present technology utilizes logic to account for route viability conditions to determine whether a route between a first edge network device and a second edge network device is likely to be usable between the edge network devices.

20 Claims, 7 Drawing Sheets

INTELLIGENT ROUTE SELECTION AND DISTRIBUTION IN SD-WAN ROUTING CONTROLLERS BASED ON PEER'S TRANSPORT CHARACTERISTICS

CROSS-REFERENCE TO RELATED APPLICATIONS

This application claims priority to U.S. provisional application No. 63/495,931, filed on Apr. 13, 2023, which is expressly incorporated by reference herein in its entirety.

BACKGROUND

In software defined networking (SD-WAN) deployments, an SD-WAN controller is responsible for selecting and distributing overlay routes belonging to different address families (e.g., TRANSPORT routes, unicast routes, etc.) to edge network devices (e.g., routers). The SD-WAN controller learns of the routes attached to a first edge network device by receiving overlay management protocol (OMP) reports from the edge network device. The SD-WAN controller then selects a number of the routes attached to the first edge network device for distribution to second edge network devices in the SD-WAN. The SD-WAN controller selects a limited number of these routes at random, up to a configurable limit, called a send-path-limit.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
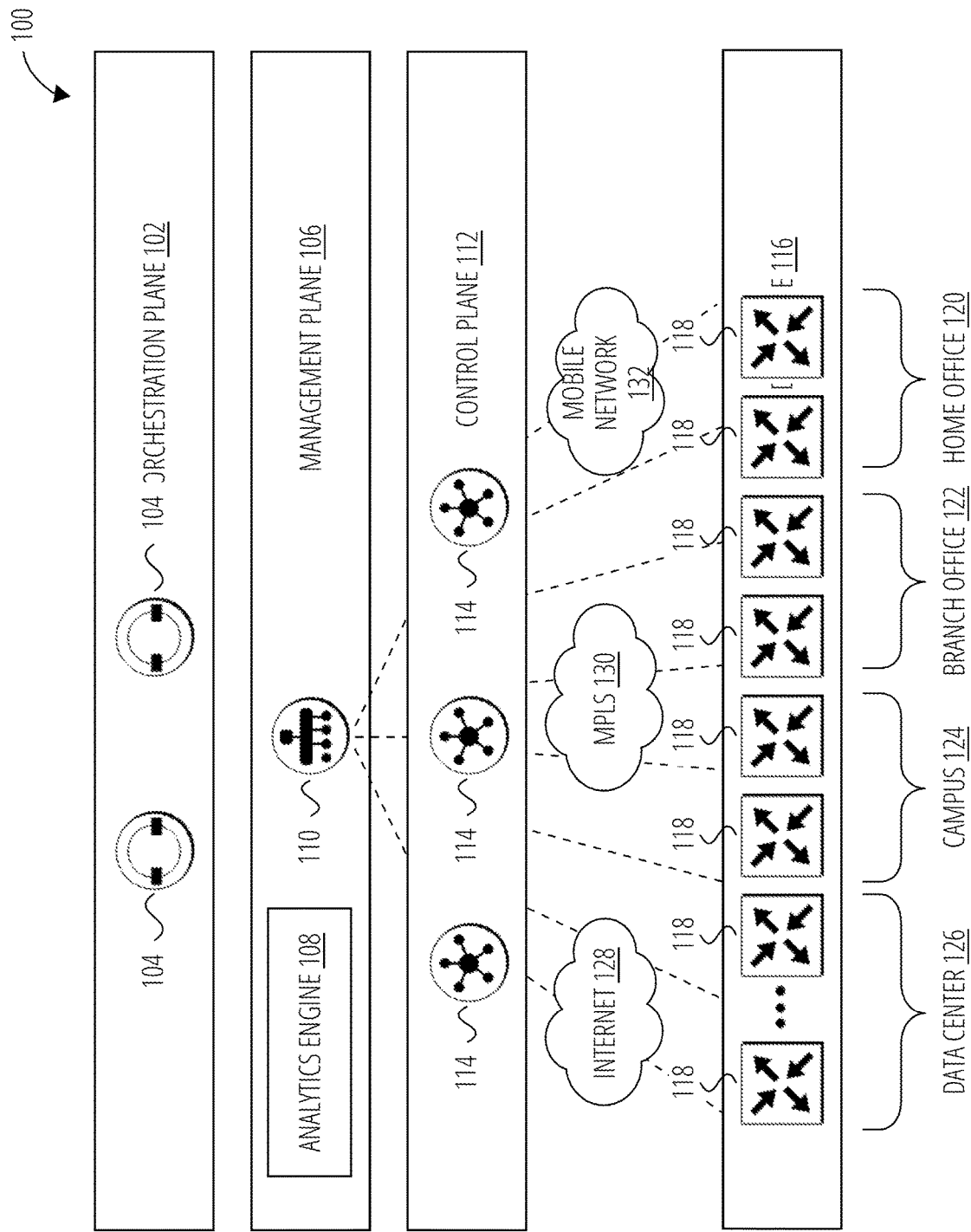
FIG. 1 illustrates an example of a network architecture for implementing aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method includes receiving, at an SD-WAN controller for an SD-WAN, data regarding routes available to reach respective edge network devices in the SD-WAN. The SD-WAN controller can select, for a first edge network device in the SD-WAN, a subset of second routes available to reach a second edge network device based on compatibility of first routes available to the first edge network device and the subset of the second routes available to the second edge network device, and advertise the subset of the second routes available to reach the second edge network device from the first edge network device to the first edge network device.

In this method, the compatibility of the initial routes offered by the first edge network device and the subset of second routes available to the second device are determined by analyzing the transport routes associated with each route.

As part of the method, non-compatible routes are not advertised to the first edge network device.

As part of the method, information about available routes to reach edge network devices in an SD-WAN is obtained through an OMP message. This message contains details about transport colors and tunnel-group-IDs that are configured on the respective edge network device, as well as the specific transport colors for which color-restrict is enabled. Other technical features may be readily apparent to one skilled in the art from the following figures, descriptions, and claims.

The method may also include where the compatibility of transport routes associated with the first routes and the second routes are determined from a transport compatibility matrix. The transport compatibility matrix includes compatible and incompatible transport routes.

The method may also include where the transport compatibility matrix is constructed using one or more heuristics, including a public transport heuristic that designates combinations of public transport routes as compatible, a private transport heuristic that designates combinations of different private transport routes as non-compatible, and a public-private transport heuristic that designates combinations of private transport routes with public transport routes as non-compatible.

The method may also include further includes defining exceptions and overrides to the heuristics, where the transport compatibility matrix is constructed utilizing the defined exceptions and overrides with the heuristics.

As part of this method, the SD-WAN controller determines a subset of second routes available to reach a second edge network device for the first edge network device. This is done by checking the transport route of the available route against the transport compatibility matrix for the first edge network device. The route is dropped if it is found to be incompatible. The controller also checks the tunnel-group-id and transport-color of the available route. If the first edge network device is not interested in the tunnel-group-id or the transport-color is restricted based on the color-restrict settings on the first edge network device, the route is dropped.

Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology addresses the need in the art for intelligently selecting routes to be distributed to edge network devices from SD-WAN controllers. Rather than indiscriminately distributing routes, the present technology introduces logic to determine whether a route between a first edge network device and a second edge network device is likely to be usable between the edge network devices.

In software defined networking (SD-WAN) deployments, an SD-WAN controller is responsible for selecting and distributing overlay routes belonging to different address families (e.g., TRANSPORT routes, unicast routes, etc.) to edge network devices (e.g., routers). The SD-WAN controller learns of the routes attached to a first edge network device by receiving overlay management protocol (OMP) reports from the edge network device. The SD-WAN controller then selects a number of the routes attached to the first edge network device for distribution to second edge network devices in the SD-WAN. The SD-WAN controller selects a limited number of these routes at random, up to a configurable limit, called a send-path-limit.

However, the selected routes that are distributed to the second edge network devices often are not compatible with the routes that are configured on the second edge network devices. For example, if the first edge network device has public transport and private transport routes configured, and the second edge network device has only private transport routes configured then the only routes in which the second edge network device can use to send traffic to the first edge network device is a compatible private transport route. But, if the SD-WAN controller only distributes the public routes, then the second edge network device has not learned of any compatible route to communicate with the first edge network device.

For traffic forwarding to be viable over a unicast route received by an edge network device, the following route viability conditions need to be satisfied:
1. The next hop transport route needs to be resolvable i.e., bi-directional forwarding detection (BFD) sessions need to be active. In many circumstances, the available transport routes of an edge network device are based off underlay circuits which don't possess connectivity with the underlay circuits of the other edge network devices (such as multiprotocol label switching (MPLS) and public-internet circuits). In such scenarios, the BFD sessions on the overlay can't reach an active state, and the exchanged routes on the overlay are stuck in a non-resolvable state (in an unusable state for traffic forwarding).
2. The edge network device needs to have transport routes that are a part of the same tunnel-group as the received transport route. Tunnels are not formed between locally available transport routes and the received remote transport route if they have a tunnel-group mismatch. And consequently, unicast routes over remote transport routes in a different tunnel-group are unusable.
3. The edge network device can have a transport-color-restrict setting enabled on locally available transport routes, so if it receives remote transport routes or unicast routes that are of a different transport-color, those are completely unusable.

In some embodiments, "color" can be used to identify an individual WAN transport networks such as MPLS, Internet, LTE, 5G, etc., and different WAN transport networks may be assigned different colors (e.g., MPLS, private1, biz-internet, metro-ethernet, LTE, etc.). In this example, the network topology can utilize a color called "biz-internet" for one Internet transport network and a color called "public-internet" for another Internet transport network.

On the edge network devices, color can be used help to identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices use a private color, they may attempt to build IPSec tunnels to other edge network devices using native, private, underlay IP addresses. The public colors can include 3g, biz, internet, blue, bronze, custom1, custom2, custom3, default, gold, green, LTE, public-internet, red, and silver. The public colors may be used by the edge network devices to build tunnels to post-NAT IP addresses (if there is NAT involved). If the edge network devices use private colors and need NAT to communicate to other private colors, the carrier setting in the configuration can dictate whether the edge network devices use private or public IP addresses. Using this setting, two private colors can establish a session when one or both are using NAT.

Traditional path selection logic in SD-WAN controllers do not consider the "route viability conditions" of specific available paths for the destination edge network device. This means that the paths that are selected and distributed by SD-WAN controllers might be completely unusable and irrelevant to a particular edge network device.

This problem is worsened by the fact that the SD-WAN controller has an upper limit of the number of paths it can potentially distribute to an edge network device (send-path-limit). The SD-WAN controller might probabilistically select and distribute only non-viable paths instead of sending the most viable and useful paths. This can completely break basic connectivity across different parts of the SD-WAN network. One current work around for this problem is to increase the send-path-limit to a very high value to ensure that all the viable/relevant paths have a higher chance of being received by edge network devices. However, this results in a higher number of non-viable paths being sent to edge network devices to increase the probability of receiving at least one viable path. This results in extra work for the edge network devices to manage a greater number of transport routes including a greater number that might not work. The higher send path limit also creates scalability and stability issues on the SD-WAN controllers, since the SD-WAN controllers must compute, store, and distribute more paths (including non-viable paths) to edge network devices.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

FIG. 1 illustrates an example of a network architecture 100 for implementing aspects of the present technology. An example of an implementation of the network architecture 100 is the Cisco® SD-WAN architecture, but the network architecture 100 applies to any SD-WAN network. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrators 104. The network orchestrators 104 can perform the initial authentication of the edge network devices 118 and orchestrate connectivity between devices of the control plane 112 and the data plane 116. In some embodiments, the network orchestrators 104 can also enable communication of devices located behind Network Address Translation (NAT). In some embodiments, physical or virtual Cisco® SD-WAN vBond orchestrator can operate as the network orchestrators 104.

The management plane 106 can be responsible for central configuration and monitoring of a network. The management plane 106 can include one or more physical or virtual network management services 110. In some embodiments, the network management service 110 can provide centralized management of the network via a graphical user interface to enable a user to monitor, configure, and maintain the edge network devices 118 and links (e.g., internet transport network 128, MPLS network 130, 4G/mobile network 132) in an underlay and overlay network. The network management service 110 can support multi-tenancy and enable centralized management of logically isolated networks associated with different entities (e.g., enterprises, divisions within enterprises, groups within divisions, etc.). Alternatively or in addition, the network management service 110 can be a dedicated network management system for a single entity. In some embodiments, Cisco® SD-WAN vManage service can operate as the network management service 110.

The control plane 112 can build and maintain a network topology and make decisions on where traffic flows. The control plane 112 can include one or more physical or virtual SD-WAN controllers 114. The SD-WAN controllers 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.).

In some embodiments, the SD-WAN controllers 114 can operate as route reflectors. The SD-WAN controllers 114 can also orchestrate secure connectivity in the data plane 116 between and among the edge network devices 118. For example, in some embodiments, the SD-WAN controllers 114 can distribute crypto key information among the edge network devices 118. This can allow the network to support a secure network protocol or application (e.g., Internet Protocol Security (IPSec), transport Layer Security (TLS), Secure Shell (SSH), etc.) without Internet Key Exchange (IKE) and enable scalability of the network. In some embodiments, physical or virtual Cisco® SD-WAN vSmart controllers can operate as the SD-WAN controllers 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN TRANSPORTs, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
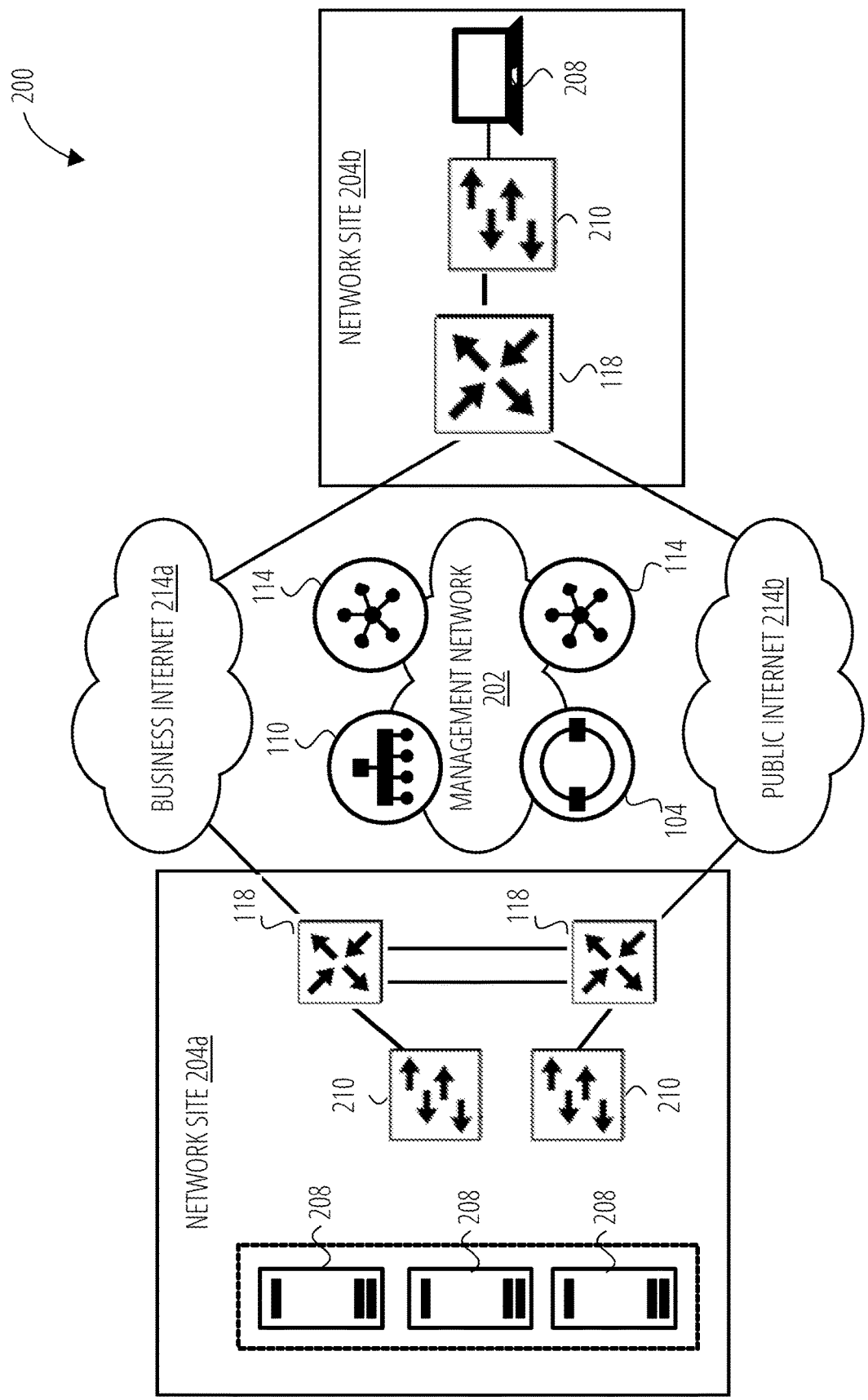
FIG. 2 illustrates an example of a network topology in accordance with some aspects of the present technology.

FIG. 2 illustrates an example of a network topology 200 for showing various aspects of the network architecture 100. The network topology 200 can include a Management network 202, a pair of network sites 204a and 204b (also referred to herein as "sites", and collectively, 204) (e.g., the data centers 126, the campus networks 124, the branch office networks 122, the home office networks 120, cloud service provider network(s), etc.), and a pair of Internet transport networks (Business internet 214a and public internet 214b, collectively, 214). The management network 202 can include one or more network orchestrator(s) 104, one or more network management service(s) 110, and one or more SD-WAN controller(s) 114. Although the Management network 202 is shown as a single network in this example, one of ordinary skill in the art will understand that each element of the Management network 202 can be distributed across any number of networks and/or be co-located with the sites 204. In this example, each element of the Management network 202 can be reached through either Internet transport network 214.

Each site can include one or more endpoint 208 connected to one or more site network device 210. The endpoint 208 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoint 208 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network device 210 can include physical or virtual switches, routers, and other network devices. Although the network site 204a is shown including a pair of site network devices 210 and the network site 204b is shown including a single site network device 210 in this example, the site network devices 210 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network device 210 can connect the endpoint 208 to one or more edge network devices 118, and the edge network devices 118 can be used to directly connect to the Internet transport networks 214 (e.g., Business internet 214a and public internet 214b).

In some embodiments, "color" can be used to identify an individual WAN transport networks such as MPLS, Internet, LTE, 5G, etc., and different WAN transport networks may be assigned different colors (e.g., MPLS, private1, biz-internet, metro-ethernet, LTE, etc.). In this example, the network topology 200 can utilize a color called "biz-internet" for one Internet transport network (Business internet 214a) and a color called "public-internet" for another Internet transport network (public internet 214b).

In some embodiments, each edge network device 118 can form a Datagram transport Layer Security (DTLS) or TLS control connection to the SD-WAN controller(s) 114 and connect to any SD-WAN controller 114 over each internet transport network (e.g., Business internet 214a and public internet 214b). In some embodiments, the edge network devices 118 can also securely connect to edge network devices 118 in other sites via IPSec tunnels. In some embodiments, the BFD protocol may be used within each of these tunnels to detect loss, latency, jitter, and path failures.

On the edge network devices 118, color can be used help to identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 118 use a private color, they may attempt to build IPSec tunnels to other edge network devices 118 using native, private, underlay IP addresses. The public colors can include 3g, biz, internet, blue, bronze, custom1, custom2, custom3, default, gold, green, LTE, public-internet, red, and silver. The public colors may be used by the edge network devices 118 to build tunnels to post-NAT IP addresses (if there is NAT involved). If the edge network devices 118 use private colors and need NAT to communicate to other private colors, the carrier setting in the configuration can dictate whether the edge network devices 118 use private or public IP addresses. Using this setting, two private colors can establish a session when one or both are using NAT.

Figure 3:
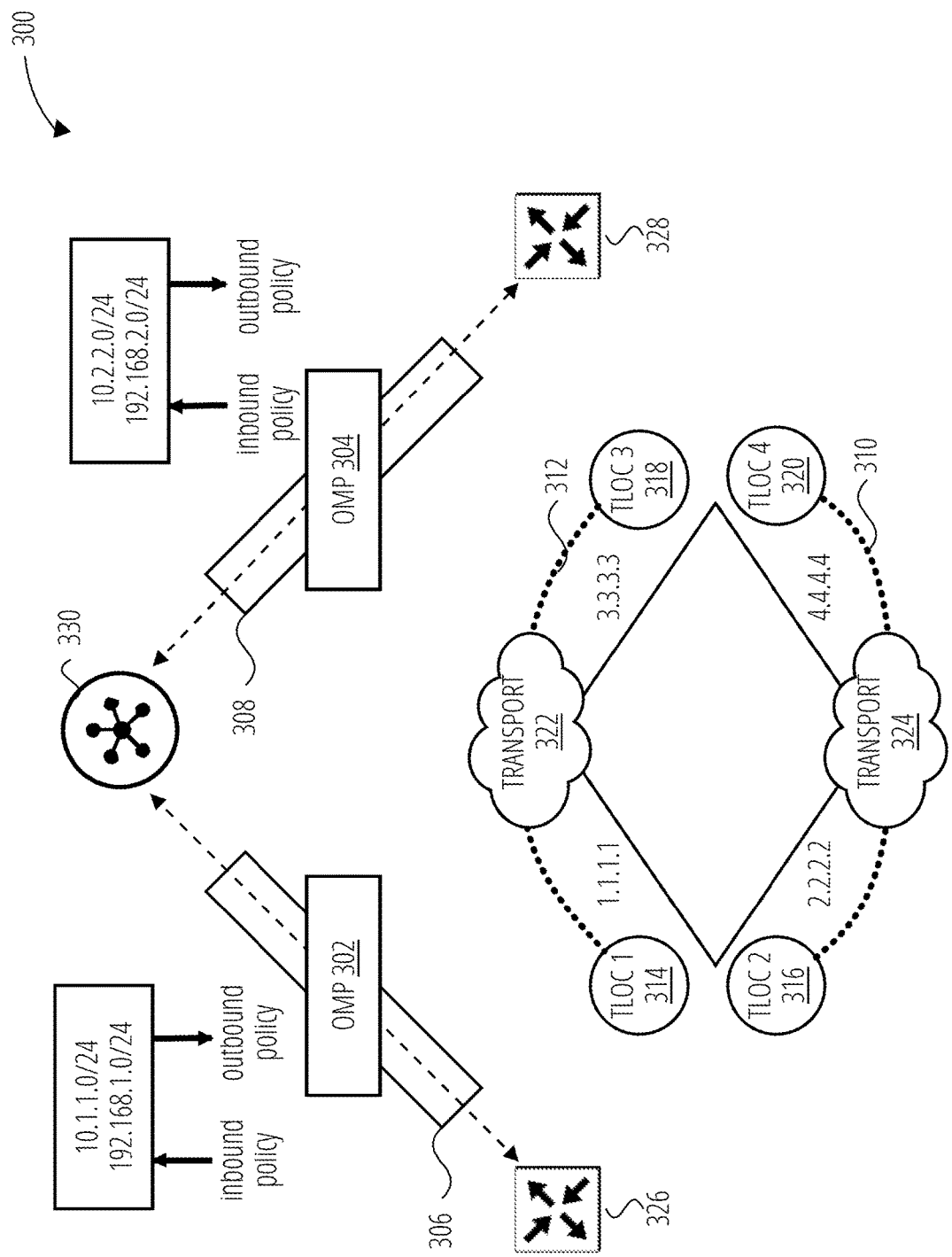
FIG. 3 illustrates an example of a diagram showing the operation of a protocol for managing an overlay network in accordance with some aspects of the present technology.

FIG. 3 illustrates an example of a diagram 300 showing the operation of OMP, which may be used in some embodiments to manage an overlay of a network (e.g., the network architecture 100). In this example, OMP messages 302 and 304 (collectively, 302) may be transmitted back and forth between the SD-WAN controller 330 and edge network devices 326 and 328 (which can each be an edge network device 118 of FIG. 1), respectively, where control plane information, such as route prefixes, next-hop routes, crypto keys, policy information, and so forth, can be exchanged over respective secure DTLS or TLS connections 306 and 308. The SD-WAN controller 330 can operate similarly to a route reflector. For example, the SD-WAN controller 330 can receive routes from the edge network devices 326 and 328, process and apply any policies to them, and advertise routes to other edge network devices in the overlay. If there is no policy defined, the edge network devices 326 and 328 may behave in a manner similar to a full mesh topology, where each edge network device 326 or 328 can connect directly to another edge network device at another site and receive full routing information from each site.

OMP can advertise at least three types of routes:
OMP routes, which can correspond to prefixes that are learned from the local site, or service side, of the edge network device 326 or 328. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network device 326 or 328 that connect into transport network 322 or 324 (which can each be an internet transport network 128 such as internet transport network 128 of FIG. 1). In some embodiments, a TLOC route can be uniquely identified and represented by a three-tuple, including an IP address, link color, and encapsulation (e.g., Generic Routing Encapsulation (GRE), IPSec, etc.). A TLOC route consists of all required information needed by a remote peer in order to establish an overlay tunnel with that TLOC. This can include a system IP address, color, and encapsulation, TLOC routes can also carry attributes such as TLOC private and public IP addresses, carrier, port, preference, site identifier, tag, and weight. In some embodiments, a TLOC may be in an active state on a particular edge network device 326 or 328 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 326 and 328 and accessible to other sites for use with service insertion. In addition, these routes can also include VPNs; the VPN labels can be sent in an update type to tell the SD-WAN controller 330 what VPNs are serviced at a remote site.

In the example of FIG. 3. OMP is shown running over the DTLS/TLS tunnels 306 and 308 established between the edge network devices 326 and 328 and the SD-WAN controller 330. In addition, the diagram 300 shows an IPSec tunnel 310 established between TLOC 314 and 318 over the (WAN) Transport network 322 and an IPSec tunnel 312 established between TLOC 316 and TLOC 320 over the (WAN) TRANSPORT network 324. Once the IPSec tunnels 310 and 312 are established, BFD can be enabled across each of them.

Figure 4A:
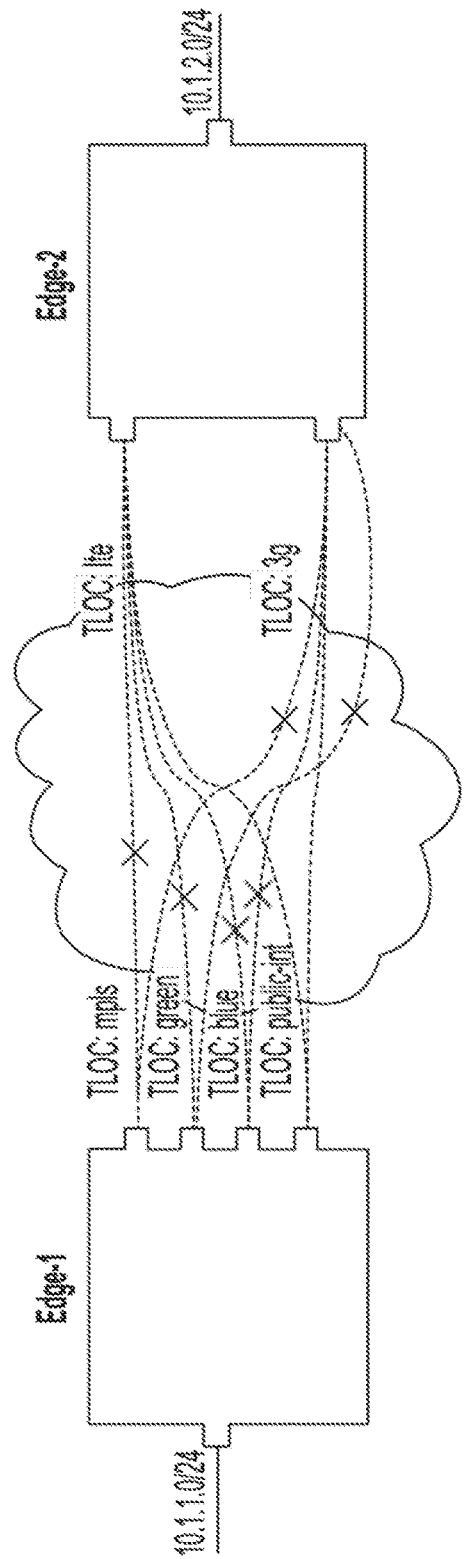
FIG. 4A illustrates an example of the problem solved by the present technology.

FIG. 4A illustrates an example of the problem solved by the present technology.

In FIG. 4A edge network device-1 (Edge-1) has four transport routes configured: MPLS, green, blue, public-internet. Edge network device-2 (Edge-2) has two transport routes configured: LTE, 3g.

As illustrated in FIG. 4A, Prefix 10.1.1.0/24 is reachable on the service side of Edge-1 and prefix 10.1.2.0/24 is reachable on the service side of Edge-2.

In this example, the SD-WAN controller has a send-path limit of 2 (i.e., the SD-WAN controller can only send two transport routes to the edge network devices.

The set of next-hop paths for prefix 10.1.2.0/24 that the SD-WAN controller distributes to Edge-1 would be the next-hop transport routes received from Edge-2 i.e., both LTE and 3g.

The set of next-hop paths for the prefix 10.1.1.0/24 that the vSmart distributes to Edge-2 are any two of the next-hop transport routes amongst the set {MPLS, green, blue, public-internet}, and the rest can get filtered out due to the send-path-limit of two. Since there is no logic that picks the useful transport routes, it is possible that the next-hop transport route of MPLS and green is chosen over the other colors in the set, but these are unusable paths on Edge-2, since BFD sessions will generally not form between its source transport routes (LTE and 3g) and the remote next-hop transport routes (e.g. MPLS and green) as addressed above with respect to the route viability conditions.

Figure 4B:
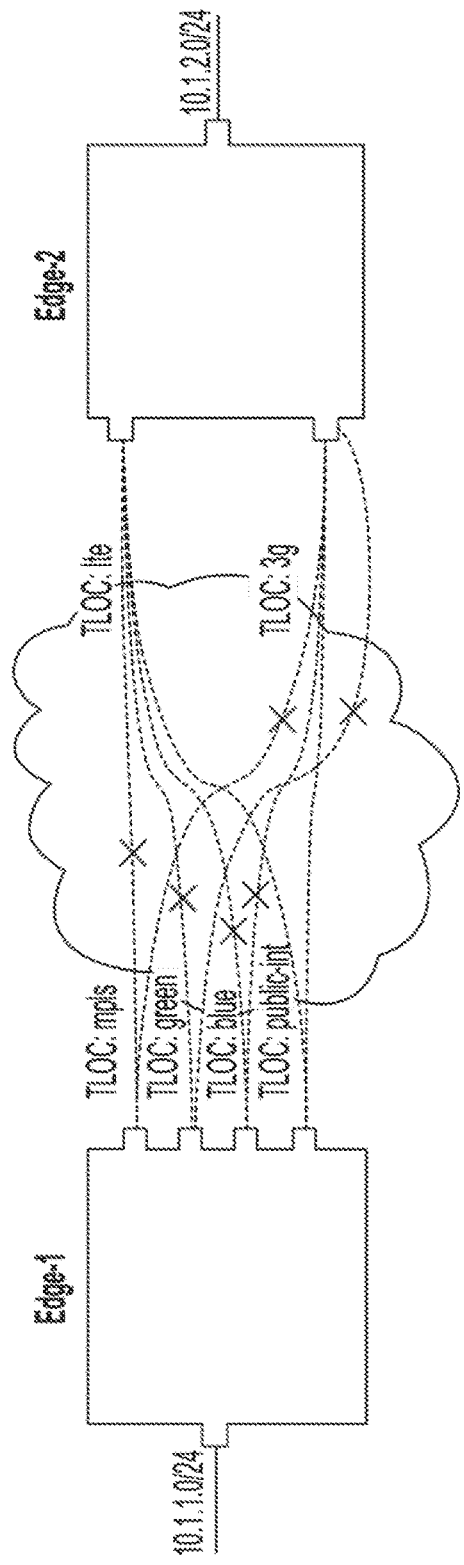
FIG. 4B illustrates an example of the solution provided by some aspects of the present technology.

FIG. 4B illustrates an example of the solution provided by some aspects the present technology. The present technology intelligently selects routes to be distributed to edge network device from SD-WAN controllers. Rather than indiscriminately distributing routes, the present technology utilizes logic to account for route viability conditions to determine whether a route between a first edge network device and a second edge network device is likely to be usable between the edge network devices.

The present technology can determine that at least transport route public-int is compatible with transport routes LTE and 3g and can reflect route public-int to Edge-2 to be used when communicating next-hop paths for the prefix 10.1.1.0/24 via Edge-1.

Figure 5:
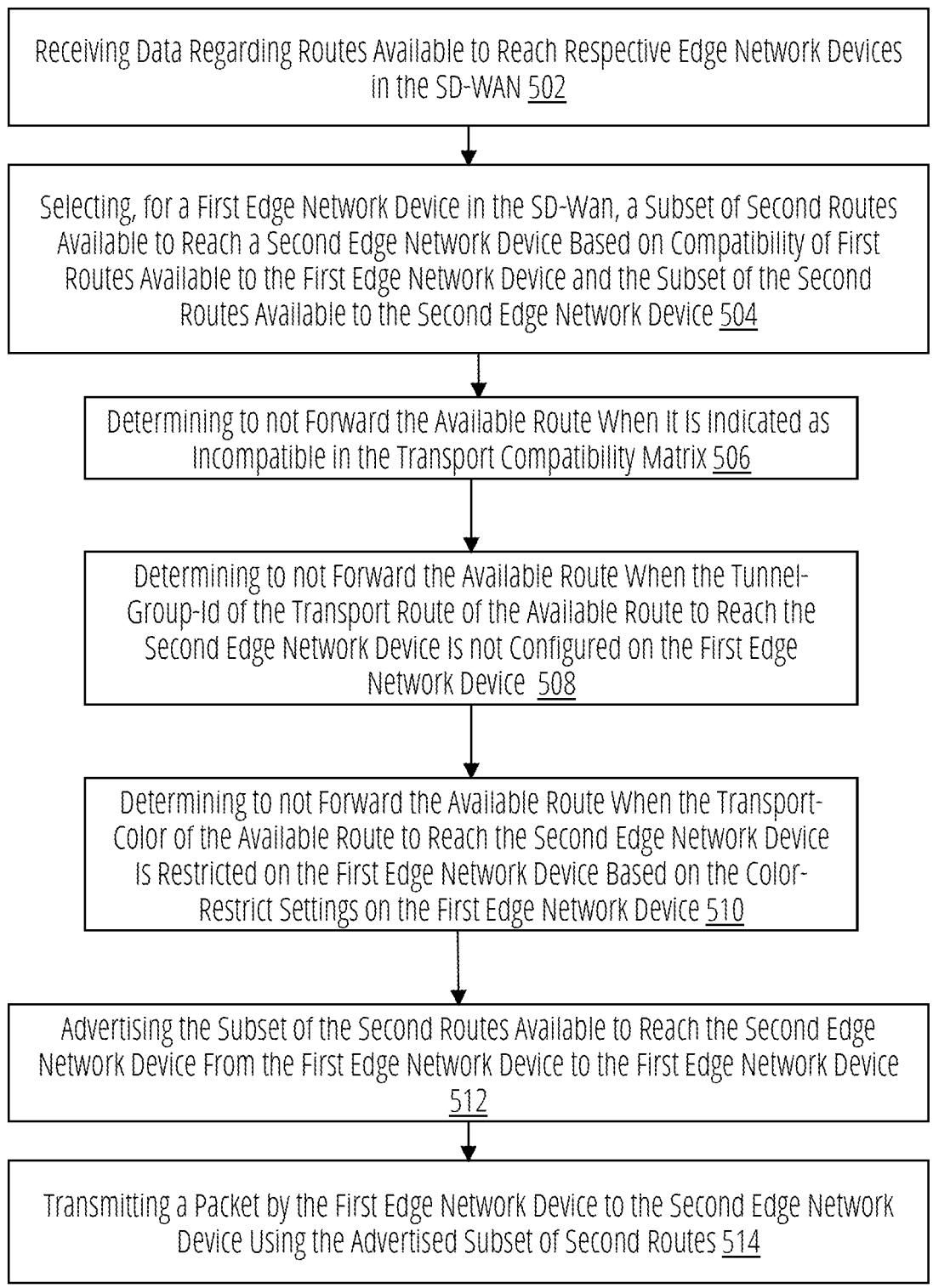
FIG. 5 illustrates an example routine for selecting compatible transport routes to reflect to edge network devices in accordance with some aspects of the present technology.

FIG. 5 illustrates an example routine for selecting compatible transport routes to reflect to edge network devices in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving data regarding routes available to reach respective edge network devices in the SD-WAN at block 502. For example, the SD-WAN controller 114 illustrated in FIG. 1 may receive data regarding routes available to reach respective edge network devices in the SD-WAN. The data regarding routes available to reach respective edge network devices in the SD-WAN, is received using an OMP message including at least a set of transport colors for routes that are configured on the respective edge network device, a set of tunnel-group-ids that are configured on the respective edge network device, and a set of transport colors for which color-restrict is enabled. As addressed above, the SD-WAN controller 114 can receive data regarding routes available to specific edge network devices, and distribute some of this information to peer edge network devices. For example, the SD-WAN controller 114 can receive an OMP messages from a first edge network device and second edge network device, and can send information about routes available and compatible between the pair of edge network devices as addressed in more detail below.

The data regarding routes available to reach respective edge network devices in the SD-WAN is based on route configurations on the respective edge network devices.

Rather than indiscriminately sending a subset of the data regarding the routes available to the second edge network device to the first edge network devices, the SD-WAN controller 114 can select routes to advertise that are available on the second edge network device that are compatible with routes available of the first edge network device. According to some examples, the method includes selecting, for advertising to a first edge network device, a subset of second routes available to reach a second edge network device based on compatibility of the second routes with the first routes at block 504.

The transport routes are compatible when the first edge network device and the second edge network device can form BFD sessions with each other when using the transport routes. In some embodiments, the compatibility of transport routes associated with the first routes and the second routes can be determined from a transport compatibility matrix, which is described in greater detail with respect to FIG. 6.

According to some examples, the method includes determining to not forward the available route when it is indicated as incompatible in the transport compatibility matrix at block 610. For example, the SD-WAN controller 114 illustrated in FIG. 1 may determine to not forward the available route when it is indicated as incompatible in the transport compatibility matrix.

According to some examples, the method includes determining to not forward the available route when the tunnel-group-id of the transport route of the available route to reach the second edge network device is not configured on the first edge network device at block 612.

According to some examples, the method includes determining to not forward the available route when the transport-color of the available route to reach the second edge network device is restricted on the first edge network device based on the color-restrict settings on the first edge network device at block 614.

According to some examples, the method includes advertising the subset of the second routes available to reach the second edge network device from the first edge network device to the first edge network device at block 512. For example, the SD-WAN controller 114 illustrated in FIG. 1 may advertise the subset of the second routes available to reach the second edge network device from the first edge network device to the first edge network device. The advertising the second routes to the first edge network device occurs using Overlay Management Protocol (OMP) route advertisement including at least a transport route, tunnel group ID, and color-restrict settings associated with a configuration state of the edge router. Non-compatible routes are not advertised to the first edge network device.

According to some examples, the method includes transmitting a packet from the first edge network device to the second edge network device using the advertised subset of second routes available to reach the second edge network device from the first edge network device at block 514. For example, the first edge network device 326 illustrated in FIG. 3 may transmit a packet to the second edge network device 328 using one the advertised subset of second routes available to reach the second edge network device 328.

In some embodiments, various optimization can also be used to efficiently enable the present technology. In one such example, the intelligent selection of routes can be based on routes as they are configured on the edge network devices as opposed to the runtime state of the transport routes. Since information about the runtime state of the transport routes changes dynamically due to network state events, consuming information about transport route runtime state directly and reacting to it can cause a lot of churning on the SD-WAN controllers and cause serious performance degradations and route convergence delays. To avoid this problem, the edge network device will send the transport route, tunnel-group-ids and color-restrict settings based on the configuration state on the edge network device, instead of the runtime state. For example, a transport route interface on the first edge network device with a transport-color green might be down, but if the configuration exists, the device will communicate that green transport route to the SD-WAN controller, to enable the SD-WAN controller to send appropriate paths configured on the second edge network device that are compatible with the transport-color green transport route on the first edge network device.

Similarly, if the first edge network device has tunnel-group-id configured on its transport routes, it'll give the tunnel-id-set to the SD-WAN controller only if the second edge network device interfaces have the tunnel-group-id configured. Otherwise, the second edge network device doesn't give any tunnel-group-id at all to the SD-WAN controller. This enables the SD-WAN controller to send transport routes of all tunnel-group-ids, since the first edge network device has at least one transport route that can make use of them and form BFD sessions.

These steps can insulate the SD-WAN controller from transient (and often frequent) runtime events/state changes in the network and helps with scalability on the SD-WAN controller.

Using all this information, the SD-WAN controller will be able to choose only the most relevant transport routes and unicast routes to be sent to every edge router. This provides: 1. Optimal path selection, individually and granularly for every edge router. 2. It also allows the send-path-limit to be configured to a much lower value, since it is more likely that a viable transport route will be reflected by the SD-WAN controller. This reduces memory and CPU usage on the SD-WAN controller. 3. Since the SD-WAN controller will have less transport routes to reflect on the control plane, the SD-WAN controller can serve networks with much higher scale requirements.

Due to all the performance optimizations described earlier (pre-computation on SD-WAN controller, the edge network devices communicating updates based on the configured state instead of on runtime state, etc.), the overhead on SD-WAN controller for filtering outbound transport route and unicast route advertisements to peers is small, and the SD-WAN controller performance and route convergence are improved.

Figure 6:
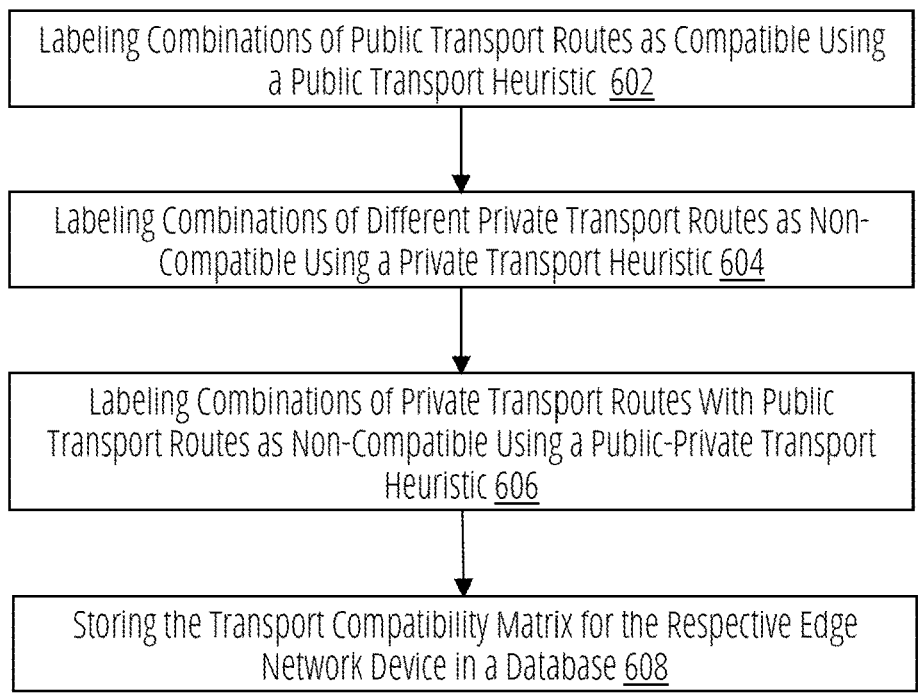
FIG. 6 illustrates an example routine for creating a transport compatibility matrix in accordance with some aspects of the present technology.

FIG. 6 illustrates an example routine for creating a transport compatibility matrix in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed below, the present technology determines whether to advertise a transport route by accounting for route viability conditions in an effort to avoid forwarding transport routes to an edge network device that is not compatible with the transport routes in use by the edge network device. The determination of route viability conditions is specific to each edge network device.

In some embodiments, the determination of whether pair of transport routes are considered compatible can be recorded in a transport compatibility matrix. The transport compatibility matrix includes compatible and incompatible transport routes. In order to efficiently distribute compatible transport routes, the transport compatibility matrix is pre-calculated in an offline process. Although, the description herein utilizes the transport compatibility matrix, persons of ordinary skill in the art will appreciate that such a data structure is not required, and reasonable alternatives can be used.

In some embodiments, the transport compatibility matrix is calculated using a collection of heuristics, and exceptions to the heuristics, which can be configured based on regions. Additionally, as noted above, the transport compatibility matrix is calculated for each specific edge network device.

The transport compatibility matrix designates a pair of transport routes as compatible when the pair of transport routes can be used by a first edge network device and a second edge network device to form BFD sessions with each other. The transport compatibility matrix designates a pair of transport routes as incompatible when the pair of transport routes cannot be used by a first edge network device and a second edge network device to form BFD sessions with each other.

With references to the heuristics, the method includes labeling combinations of public transport routes as compatible using a public transport heuristic at block 602. For example, the SD-WAN controller 114 illustrated in FIG. 1 may label combinations of public transport routes as compatible using a public transport heuristic. For example, any tuple of transport routes which are public transport routes such as LTE/3g, etc. are compatible with each other.

Another of the heuristics, includes labeling combinations of different private transport routes as non-compatible using a private transport heuristic at block 604. For example, the SD-WAN controller 114 illustrated in FIG. 1 may label combinations of different private transport routes as non-compatible using a private transport heuristic. For example, a tuple of transport routes which are private transport routes such as MPLS/private1, etc. are incompatible with each other.

Another of the heuristics, includes labeling combinations of private transport routes with public transport routes as non-compatible using a public-private transport heuristic at block 606. For example, the SD-WAN controller 114 illustrated in FIG. 1 may label combinations of private transport routes with public transport routes as non-compatible using a public-private transport heuristic. For example, tuples of transport routes where one transport route belongs to the public color list and the other belongs to the private color list are incompatible with each other.

In some embodiments, exceptions and overrides to the heuristics can be defined and might be applied regionally. The transport compatibility matrix is constructed utilizing the defined exceptions and overrides with the heuristics. The exceptions and overrides to the heuristics are defined on a per-region basis. In some scenarios, seemingly incompatible transport routes can connect with each other and exchange traffic. And similarly, there are some scenarios where seemingly compatible transport routes are unable to connect with each other and exchange traffic. To account for such scenarios, the SD-WAN controller can provide the option of defining exception rules for such compatible and incompatible transport route tuples. For instance, it would be possible to define an overriding compatibility definition to indicate compatibility between the transport routes MPLS and internet (and similarly for incompatibility overrides between transport routes).

The SD-WAN controllers can serve a wider geographic deployment, so the transport routes that are compatible in one region may not be compatible with each other in other regions (and the same applies to incompatible transport routes as well). To handle such scenarios, the definition of exceptions and overrides to the built-in compatibility/incompatibility heuristics can be configured on a per-region basis.

According to some examples, the method includes storing the transport compatibility matrix for the respective edge network device, such as the first edge network device in a database at block 608.

In some embodiments, the SD-WAN controller can pre-compute and pre-populate the transport compatibility matrix on a per-peer basis. Pre-computing the transport compatibility matrix can support the present technology to efficiently perform comparisons for individual route updates (a single SD-WAN controller can handle upwards of 150 million route updates in a single convergence window).

Figure 7:
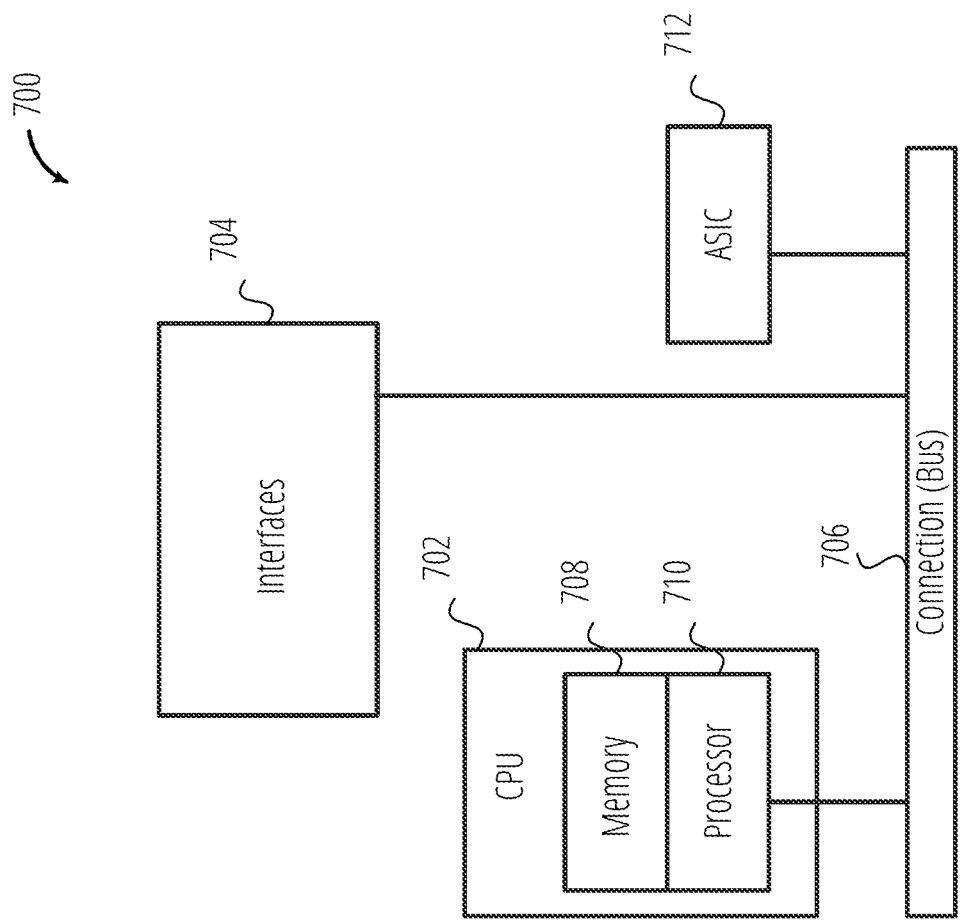
FIG. 7 illustrates an example network device suitable for performing switching, routing, load balancing, and other networking operations.

FIG. 7 illustrates an example network device 700 suitable for performing switching, routing, load balancing, and other networking operations. The example network device 700 can be implemented as switches, routers (e.g., edge network devices 118), and or SD-WAN controller 114.

Network device 700 includes a central processing unit (CPU 702), interface(s) 704, and a bus connection 706 (e.g., a PCI bus). When acting under the control of appropriate software or firmware, the CPU 702 is responsible for executing packet management, error detection, and/or routing functions. The CPU 702 preferably accomplishes all these functions under the control of software including an operating system and any appropriate applications software. CPU 702 may include one or more processors 710, such as a processor from the INTEL X86 family of microprocessors. In some cases, processor 710 can be specially designed hardware for controlling the operations of network device 700. In some cases, a memory 708 (e.g., non-volatile RAM, ROM, etc.) also forms part of CPU 702. However, there are many different ways in which memory 708 could be coupled to the system.

The interface(s) 704 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 702) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 708) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 708 could also hold various software containers and virtualized execution environments and data. Memory 708 can also include instructions for executing aspects of the routines outlined herein with respect to FIG. 5 and FIG. 6.

The network device 700 can also include an application-specific integrated circuit (ASIC) 712, which can be configured to perform routing and/or switching operations. The ASIC 712 can communicate with other components in the network device 700 via the bus connection 706, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The present technology can be further understood from the following aspects:

Aspect 1. A method comprising: receiving, at an SD-WAN controller for an SD-WAN, data regarding routes available to reach respective edge network devices in the SD-WAN; selecting, for a first edge network device in the SD-WAN, a subset of second routes available to reach a second edge network device based on compatibility of first routes available to the first edge network device and the subset of the second routes available to the second edge network device; and advertising the subset of the second routes available to reach the second edge network device from the first edge network device to the first edge network device.

Aspect 2. The method of Aspect 1, wherein the compatibility of the first routes available to the first edge network device and the subset of the second routes available to the second edge network device is based on the compatibility of transport routes associated with the first routes and the second routes.

Aspect 3. The method of any of Aspects 1 to 2, wherein the compatibility of transport routes associated with the first routes and the second routes is determined from a transport compatibility matrix, wherein the transport compatibility matrix is pre-calculated in an offline process, wherein the transport compatibility matrix includes compatible and incompatible transport routes.

Aspect 4. The method of any of Aspects 1 to 3, wherein the transport compatibility matrix is constructed using one or more heuristics, the one or more heuristics including: a public transport heuristic that designates combinations of public transport routes as compatible; a private transport heuristic that designates combinations of different private transport routes as non-compatible; and a public-private transport heuristic that designates combinations of private transport routes with public transport routes as non-compatible.

Aspect 5. The method of any of Aspects 1 to 4, further comprising: defining exceptions and overrides to the heuristics, wherein the transport compatibility matrix is constructed utilizing the defined exceptions and overrides with the heuristics.

Aspect 6. The method of any of Aspects 1 to 5, wherein the exceptions and overrides to the heuristics are defined on a per-region basis.

Aspect 7. The method of any of Aspects 1 to 6, wherein the selecting, for the first edge network device the subset of second routes available to reach a second edge network device is determined by: checking by the SD-WAN controller the transport route of the available route to reach the second edge network device against the transport compatibility matrix for the first edge network device, and dropping the route if it is incompatible; checking by the SD-WAN controller the tunnel-group-id of the transport route of the available route to reach the second edge network device that the first edge network device has not indicated that the first edge network device is not interested in this tunnel-group-id, and dropping the route if the first edge network device is not interested in this tunnel-group-id; checking by the SD-WAN controller the transport-color of the available route to reach the second edge network device to determine that the transport-color is not restricted on the first edge network device based on the color-restrict settings on the first edge network device, and dropping the route if the transport-color is restricted on the first edge network device.

Aspect 8. The method of any of Aspects 1 to 7, wherein the first routes available to the first edge network device and the subset of the second routes available to the second edge network device are compatible when the first edge network device and the second edge network device can form BFD sessions with each other.

Aspect 9. The method of any of Aspects 1 to 8, further comprising: transmitting a packet from the first edge network device to the second edge network device using the advertised subset of second routes available to reach the second edge network device from the first edge network device.

Aspect 10. The method of any of Aspects 1 to 9, wherein the data regarding routes available to reach respective edge network devices in the SD-WAN is based on route configurations on the respective edge network devices.

Aspect 11. The method of any of Aspects 1 to 10, wherein non-compatible routes are not advertised to the first edge network device.

Aspect 12. The method of any of Aspects 1 to 11, wherein the advertising the second routes to the first edge network device occurs using Overlay Management Protocol (OMP) route advertisement including a transport route, tunnel group ID, and color-restrict settings associated with a configuration state of the edge router.

Aspect 13. The method of any of Aspects 1 to 12, wherein the receiving, at the SD-WAN controller, the data regarding routes available to reach respective edge network devices in the SD-WAN, is received using an OMP message including a set of transport colors that are configured on the respective edge network device, a set of tunnel-group-ids that are configured on the respective edge network device, and a set of transport colors for which color-restrict is enabled.

What is claimed is:

1. A method comprising:
   receiving, at an SD-WAN controller for an SD-WAN, data regarding routes available to reach respective edge network devices in the SD-WAN;
   selecting, for a first edge network device in the SD-WAN, a subset of second routes available to reach a second edge network device based on compatibility of first routes available to the first edge network device and the subset of the second routes available to the second edge network device, where the compatibility is based on compatibility of transport routes associated with the first routes and the second routes, and wherein the compatibility of transport routes is determined from a transport compatibility matrix, wherein the transport compatibility matrix is pre-calculated in an offline process and includes compatible and incompatible transport routes; and
   advertising the subset of the second routes available to reach the second edge network device from the first edge network device to the first edge network device.

2. The method of claim 1, wherein the transport compatibility matrix is constructed using one or more heuristics, the one or more heuristics including:
   a public transport heuristic that designates combinations of public transport routes as compatible;
   a private transport heuristic that designates combinations of different private transport routes as non-compatible; and
   a public-private transport heuristic that designates combinations of private transport routes with the public transport routes as non-compatible.

3. The method of claim 2, further comprising:
   defining exceptions and overrides to the one or more heuristics, wherein the transport compatibility matrix is constructed utilizing the defined exceptions and overrides with the one or more heuristics.

4. The method of claim 1, wherein non-compatible routes are not advertised to the first edge network device.

5. The method of claim 1, wherein the receiving, at the SD-WAN controller, the data regarding the routes available to reach the respective edge network devices in the SD-WAN, is received using an OMP message including a set of transport colors that are configured on the respective edge network device, a set of tunnel-group-ids that are configured on the respective edge network device, and the set of transport colors for which color-restrict is enabled.

6. The method of claim 1, wherein the selecting, for the first edge network device the subset of second routes available to reach the second edge network device is determined by:
   checking by the SD-WAN controller the transport route of the available route to reach the second edge network device against the transport compatibility matrix for the first edge network device, and dropping the transport route if it is incompatible;
   checking by the SD-WAN controller a tunnel-group-id of the transport route of the available route to reach the second edge network device that the first edge network device has not indicated that the first edge network device is not interested in the tunnel-group-id, and dropping the route if the first edge network device is not interested in this tunnel-group-id; and
   checking by the SD-WAN controller a transport-color of the available route to reach the second edge network device to determine that the transport-color is not restricted on the first edge network device based on color-restrict settings on the first edge network device, and
   dropping the route if the transport-color is restricted on the first edge network device.

7. A computing system comprising:
   a processor; and
   a memory storing instructions that, when executed by the processor, configure the system to:
   receive, at an SD-WAN controller for an SD-WAN, data regarding routes available to reach respective edge network devices in the SD-WAN;
   select, for a first edge network device in the SD-WAN, a subset of second routes available to reach a second edge network device based on compatibility of first routes available to the first edge network device and the subset of the second routes available to the second edge network device, where the compatibility is based on compatibility of transport routes associated with the first routes and the second routes, and wherein the compatibility of transport routes is determined from a transport compatibility matrix, wherein the transport compatibility matrix is pre-calculated in an offline process and includes compatible and incompatible transport routes; and advertise the subset of the second routes available to reach the second edge network device from the first edge network device to the first edge network device.

8. The computing system of claim 7, wherein the transport compatibility matrix is constructed using one or more heuristics, the one or more heuristics including:
   a public transport heuristic that designates combinations of public transport routes as compatible;
   a private transport heuristic that designates combinations of different private transport routes as non-compatible; and
   a public-private transport heuristic that designates combinations of private transport routes with the public transport routes as non-compatible.

9. The computing system of claim 7, wherein the receiving, at the SD-WAN controller, the data regarding routes available to reach respective edge network devices in the SD-WAN, is received using an OMP message including a set of transport colors that are configured on the respective edge network device, a set of tunnel-group-ids that are configured on the respective edge network device, and a set of transport colors for which color-restrict is enabled.

10. The computing system of claim 7, wherein the selecting, for the first edge network device the subset of second routes available to reach the second edge network device is determined by:
   check by the SD-WAN controller the transport route of the available route to reach the second edge network device against the transport compatibility matrix for the first edge network device, and dropping the transport route if it is incompatible;
   check by the SD-WAN controller a tunnel-group-id of the transport route of the available route to reach the second edge network device that the first edge network device has not indicated that the first edge network device is not interested in the tunnel-group-id, and dropping the route if the first edge network device is not interested in this tunnel-group-id; and
   check by the SD-WAN controller a transport-color of the available route to reach the second edge network device to determine that the transport-color is not restricted on the first edge network device based on color-restrict settings on the first edge network device, and
dropping the route if the transport-color is restricted on the first edge network device.

11. A non-transitory computer-readable storage medium, the computer-readable storage medium including instructions that when executed by at least one processor, cause the at least one processor to:
   receive, at an SD-WAN controller for an SD-WAN, data regarding routes available to reach respective edge network devices in the SD-WAN;
   select, for a first edge network device in the SD-WAN, a subset of second routes available to reach a second edge network device based on compatibility of first routes available to the first edge network device and the subset of the second routes available to the second edge network device, where the compatibility is based on compatibility of transport routes associated with the first routes and the second routes, and wherein the compatibility of transport routes is determined from a transport compatibility matrix, wherein the transport compatibility matrix is pre-calculated in an offline process and includes compatible and incompatible transport routes; and
   advertise the subset of the second routes available to reach the second edge network device from the first edge network device to the first edge network device.

12. The computer-readable storage medium of claim 11, wherein the transport compatibility matrix is constructed using one or more heuristics, the one or more heuristics including:
   a public transport heuristic that designates combinations of public transport routes as compatible;
   a private transport heuristic that designates combinations of different private transport routes as non-compatible; and
   a public-private transport heuristic that designates combinations of private transport routes with the public transport routes as non-compatible.

13. The computer-readable storage medium of claim 12, wherein the instructions further configure the at least one processor to:
   define exceptions and overrides to the one or more heuristics, wherein the transport compatibility matrix is constructed utilizing the defined exceptions and overrides with the one or more heuristics.

14. The computer-readable storage medium of claim 11, wherein non-compatible routes are not advertised to the first edge network device.

15. The computing system of claim 8, further comprising:
   defining exceptions and overrides to the one or more heuristics, wherein the transport compatibility matrix is constructed utilizing the defined exceptions and overrides with the one or more heuristics.

16. The computing system of claim 7, wherein non-compatible routes are not advertised to the first edge network device.

17. The computer-readable storage medium of claim 11, wherein the receiving, at the SD-WAN controller, the data regarding the routes available to reach the respective edge network devices in the SD-WAN, is received using an OMP message including a set of transport colors that are configured on the respective edge network device, a set of tunnel-group-ids that are configured on the respective edge network device, and the set of transport colors for which color-restrict is enabled.

18. The computer-readable storage medium of claim 11, wherein the selecting, for the first edge network device the subset of second routes available to reach the second edge network device is determined by:
   checking by the SD-WAN controller the transport route of the available route to reach the second edge network device against the transport compatibility matrix for the first edge network device, and dropping the transport route if it is incompatible;
   checking by the SD-WAN controller a tunnel-group-id of the transport route of the available route to reach the second edge network device that the first edge network device has not indicated that the first edge network device is not interested in the tunnel-group-id, and dropping the route if the first edge network device is not interested in this tunnel-group-id; and
   checking by the SD-WAN controller a transport-color of the available route to reach the second edge network device to determine that the transport-color is not restricted on the first edge network device based on color-restrict settings on the first edge network device, and dropping the route if the transport-color is restricted on the first edge network device.

19. The method of claim 1, wherein the transport compatibility matrix is constructed using one or more heuristics, the one or more heuristics including:

a public transport heuristic that designates combinations of public transport routes as compatible.

20. The method of claim 1, wherein the transport compatibility matrix is constructed using one or more heuristics, the one or more heuristics including:

a private transport heuristic that designates combinations of different private transport routes as non-compatible.

* * * * *